Figure 1:
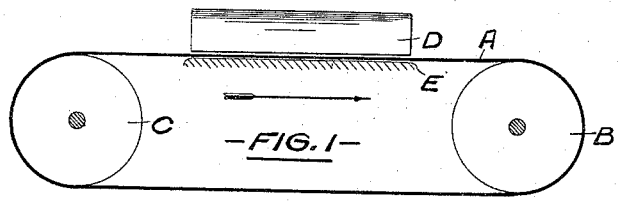

No. 640,944. Patented Jan. 9, 1900.
C. E. & J. E. POINTON.
MACHINE FOR MOLDING DOUGH.
(Application filed Sept. 26, 1899.)

(No Model.) 2 Sheets—Sheet 1.

WITNESSES:
Ella L. Giles

INVENTORS
Charles Edward Pointon
John Edward Pointon
BY Richardson
ATTORNEYS.

THE NORRIS PETERS CO., PHOTO-LITHO., WASHINGTON, D. C.

No. 640,944. Patented Jan. 9, 1900.
C. E. & J. E. POINTON.
MACHINE FOR MOLDING DOUGH.
(Application filed Sept. 26, 1899.)
(No Model.) 2 Sheets—Sheet 2.
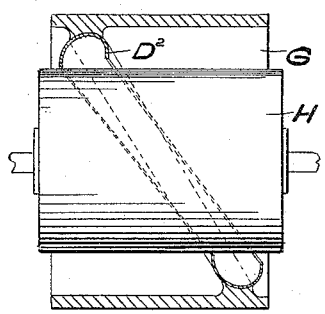
—FIG. 6—
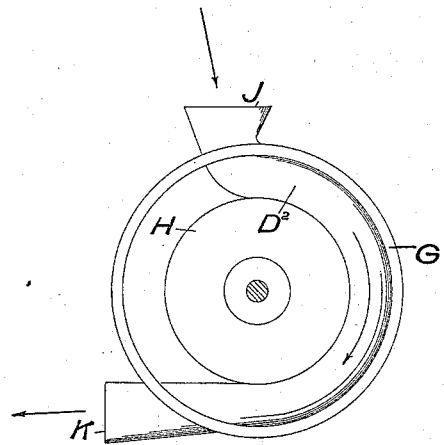
—FIG. 7—
WITNESSES:
Ella L. Giles
O'Bannon
INVENTORS.
Charles Edward Pointon
John Edward Pointon
BY Richard
ATTORNEYS

UNITED STATES PATENT OFFICE.

CHARLES E. POINTON AND JOHN E. POINTON, OF WELLINGTON, ENGLAND, ASSIGNORS TO THE LEWIS & POINTON'S PANIFICATION, LIMITED, OF LONDON, ENGLAND.

MACHINE FOR MOLDING DOUGH.

SPECIFICATION forming part of Letters Patent No. 640,944, dated January 9, 1900.

Application filed September 26, 1899. Serial No. 731,745. (No model.)

*To all whom it may concern:*

Be it known that we, CHARLES EDWARD POINTON and JOHN EDWARD POINTON, subjects of the Queen of Great Britain and Ireland, and residents of Wrekin road, Wellington, in the county of Salop, England, have invented certain new and useful Improvements in Machines for Molding Dough and Like Plastic Material, (for which we have filed an application in Great Britain, No. 17,185, bearing date August 9, 1898,) of which the following is a specification.

This invention consists of improvements in machines for molding dough and like plastic material, our object being to produce simple and convenient machines for rapid and efficient molding by imparting a pressure and surface tension to the pieces of dough or like material after the manner of hand-molding.

In the application of our invention in one manner we employ a molding-trough of the required shape, which we set at an angle across the bed or framing of our molding-machine. Between the under and open side of the trough and the said bed or framing we cause an endless band or belt or a table to travel, making it to run flush with the bottom edge of the trough, and thus to form the base of the latter. The dough or like plastic material is fed into one end of the trough, and by the action of the moving band or table, in conjunction with the inclination of the trough to the center line of such band or the center of the table, a combined forward and cross rolling or a screw-like motion is imparted to the dough or like material, whereby the skin is stretched and the material molded to the required form after the manner of hand-molding.

The working surface of the molding-trough is curved to any required shape to suit the various classes of plastic materials, and the trough itself is set at such a position in relation to the moving band, belt, or table as will give the necessary tension to the dough and mold it to the required shape with a smooth skin or surface.

The discharge or outlet end of the trough is made in such a form that the pressure upon the dough or like plastic material will be gradually released and the molded piece of dough be discharged with its rear end closed and molded after the manner of molding by hand.

In another manner of carrying our invention into effect we employ a barrel or cylinder, on the inside of which we form or attach our molding-trough, extending it from one end of the barrel to the other in a screw or spiral form of the required section or shape. Within this barrel, which is fixed stationary on suitable supports, we place a smaller or inner barrel, drum, or roller, arranged to be turned or revolved by any ordinary means. The periphery of the drum is arranged to move adjacent to the edges of the molding-trough. The dough to be molded is placed in one end of the trough, and as it is carried through the same by the action of the revolving drum the spiral disposition of the trough causes a combined forward and cross rolling or a screw-like motion to be imparted to it. The revolving drum thus serves the same function as the moving band or table hereinbefore described.

Figure 2:
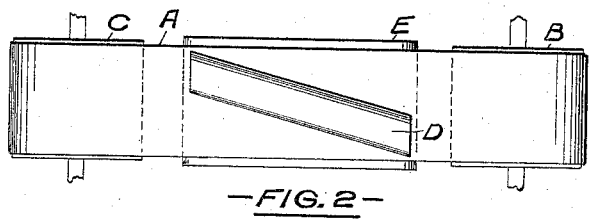
Figure 3:
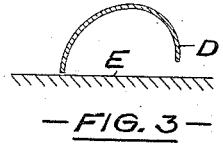
Figure 4:
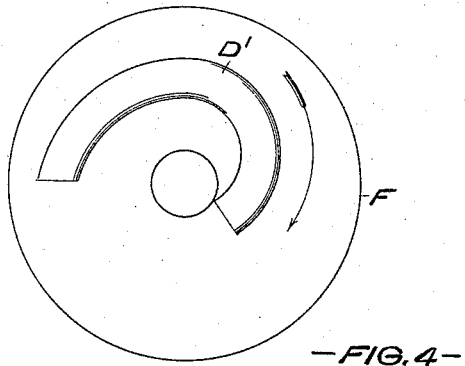

Referring to the two accompanying sheets of explanatory diagrams, Figure 1 is an elevation, and Fig. 2 a plan, representing the arrangement of the molding-trough, with an endless band or belt serving as the dough-carrier. Fig. 3 is a cross-section of the trough to a larger scale. Fig. 4 is a plan, and Fig. 5 an elevation, representing the arrangement of the molding-trough with a circular table serving as the dough-carrier. Fig. 6 is a sectional side elevation, and Fig. 7 an end elevation, representing our barrel or cylinder type molding-machine.

The same reference-letters in the different views indicate the same parts.

Referring to Figs. 1, 2, and 3, the dough-carrier, consisting of the band or belt A, is placed over the drum or pulleys B and C, as shown. The upper or working side of the band, which is driven in the direction indicated by the arrow, is caused to pass under the inclined molding-trough D and adjacent to the under and open side thereof. The trough is supported in any convenient manner in its position above the band A. Undue sagging of the upper or working side of the band is prevented by the guard or supporting-bed E. The pieces of dough to be molded are placed on the upper side of the band A and by the movement of the latter are carried through the inclined trough D. In passing through the trough the dough has a combined forward and cross rolling or a screw-like motion imparted to it and is molded to the required form with a smooth and even skin or surface, such as is attained by hand-molding.

Figure 5:
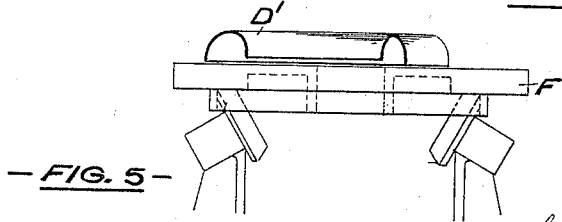

In Figs. 4 and 5 the dough-carrier consists of a circular table, as F, which is rotated in the direction indicated by the arrow at Fig. 4. The molding-trough D', which is fixed in its position in any convenient manner, has its under and open side adjacent to the upper face of the rotating table or dough-carrier F. The trough is not fixed in a position concentric with the table, but is arranged and fixed in an eccentric, spiral, or angular form, as illustrated, in order that as the dough is rolled through the trough by the action of the rotating table or carrier F it shall be at the same time turned or rolled in a cross or transverse direction. We thus impart to the dough a combined forward and cross rolling or a screw-like motion as it is passed through the trough, as with the arrangement of the trough with the endless-band type of dough-carrier, as hereinbefore described. The molded-dough portions are discharged through the central aperture of the rotating table or carrier F. The angularity or eccentricity of the trough is made to suit the amount of working required to be given to the particular class of dough or plastic material to be molded.

In the type of machine represented at Figs. 6 and 7 we arrange within a barrel or cylinder G, which is fixed upon any suitable supports or standards, a smaller and rotatable cylinder or roller H, and in the space between them we place the angularly or spirally disposed trough $D^2$, having its open side adjacent to the outer or convex surface of the roller H and its closed side fixed to the inner or concave surface of the barrel G. The pieces of dough to be molded are inserted through an aperture, as J, and discharged at K.

Having now described our invention, what we claim as new, and desire to secure by Letters Patent, is—

1. A machine for molding dough and like plastic materials comprising a carrier with means for operating the same and a molding-trough disposed at an angle to the line of motion of said carrier, substantially as described.

2. In machines for molding dough and like plastic material, the combination consisting of the endless-band conveyer A, running over drums B and C, a molding-trough D fixed above the upper side of the said conveyer A and at an angle with its line of motion, and a supporting-bed E, substantially as set forth.

In witness whereof we have hereunto set our hands in presence of two witnesses.

CHARLES E. POINTON.
JOHN E. POINTON.

Witnesses:
ARTHUR S. CORSER,
HERBERT BOWKETT.